(12) United States Patent
Oguchi (10) Patent No.: US 7,791,772 B2
(45) Date of Patent: Sep. 7, 2010

(54) IMAGE READING APPARATUS AND MULTI-FUNCTION MACHINE

(75) Inventor: Satoshi Oguchi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 667 days.

(21) Appl. No.: 11/831,775

(22) Filed: Jul. 31, 2007

(65) Prior Publication Data

US 2008/0316550 A1    Dec. 25, 2008

(30) Foreign Application Priority Data

Aug. 1, 2006    (JP)    ............................ 2006-209516

(51) Int. Cl.
*H04N 1/04* (2006.01)
(52) U.S. Cl. ...................... 358/475; 358/474
(58) Field of Classification Search ................ 358/475, 358/474, 472, 483, 497, 505; 271/10.11, 271/125
See application file for complete search history.

(56) References Cited

U.S. PATENT DOCUMENTS 6,260,839 B1 *    7/2001    Araki et al. .............. 271/10.11
6,824,132 B2 *    11/2004    Asai et al. .................. 271/125
7,232,124 B2 *    6/2007    Koh et al. ................... 271/125

FOREIGN PATENT DOCUMENTS

| JP | 07-143296 | 6/1995 |
| JP | 07-154538 | 6/1995 |
| JP | 07-231378 | 8/1995 |
| JP | 07-240821 | 9/1995 |
| JP | 10-003205 | 1/1998 |
| JP | 10-319305 | 12/1998 |

* cited by examiner

*Primary Examiner*—Douglas Q Tran
(74) *Attorney, Agent, or Firm*—Workman Nydegger (57) ABSTRACT

In an image reading device which includes a transmission light source and a pickup device which face each other with original platen glass for holding an original interposed therebetween, receives light irradiated from the transmission light source by the pickup device, and reads a light transmission original, a pickup device movement mechanism which reciprocally moves the pickup device in a predetermined direction is interlockingly connected to a light source movement mechanism which reciprocally moves the transmission light source in the predetermined direction in interlock with the reciprocal movement of the pickup device movement mechanism by a connection mechanism. The connection mechanism has a torque limiter function for generating sliding between the light source movement mechanism and the pickup device movement mechanism when torque equal to or greater than a predetermined value is delivered.

8 Claims, 12 Drawing Sheets

IMAGE READING APPARATUS AND MULTI-FUNCTION MACHINE

TECHNICAL FIELD

The present invention relates to an image reading device and a multi-function machine.

BACKGROUND ART

Conventionally, there is provided an image reading device including a reading mechanism for allowing a light source opposed to a pickup device with an original interposed therebetween to irradiate light and detecting the intensity of light formed on the pickup device after the light transmits a light transmission original (hereinafter, referred to as a transmission original) such as a film so as to optically read an image of a transmission original.

In such an image reading device, the light source and the pickup device may be provided so as to be reciprocally moved in a sub-scanning direction and the light source and the pickup device may be independently moved using driving mechanisms. In the image reading device in which the light source and the pickup device are reciprocally moved in the sub-scan direction, the light source and the pickup device may be disconnected. In this image reading device, for example, the light source is provided on a cover member of the image reading device such that the light source and the pickup device are connected/disconnected by closing/opening the cover member when an original is set.

In the image reading device in which the light source and the pickup device can be disconnected, when the light source and the pickup device are connected again, a relative position between the light source and the pickup device in the sub-scanning direction may be shifted from a position suitable for reading the original. Accordingly, when the original is instructed to be read, the relative position between the light source and the pickup device in the sub-scanning direction is corrected before an operation for reading the original.

For example, there is a scanner device in which position display means for displaying the position of a first main body side carriage is mounted in the first main body side carriage of a conventional scanner main body, a unit side carriage driven by a motor is mounted in a transmission unit, a unit side light source and a position detection sensor are mounted in the unit side carriage, and the motor is driven by a control circuit such that the unit side carriage is moved to a position for detecting the position display means so as to conform to the position of the first main body side carriage when the position detection sensor does not detect the position display means at the same time of reading a transmission original (for example, see Patent Document 1).

Patent Document 1: Japanese Unexamined Application Patent Publication No. Hei7-231378

However, the above-described conventional technology, since the light source and the pickup device are independently moved using the driving mechanisms, the relative position between the light source and the pickup device in the sub-scanning direction may be sifted and reading precision may be deteriorated. In addition, in the above-described conventional technology, since the light source and the pickup device are independently moved using the driving mechanisms, the image reading device becomes large-sized and power consumption is increased.

In the technology disclosed in Patent Document 1, in order to adjust the relative position between the light source and the pickup device in the sub-scanning direction, it is necessary to mount the position detection sensor in the unit side carriage. Thus, the manufacturing cost of the device is increased.

SUMMARY OF THE INVENTION

According to an aspect of the present invention, there is provided an image reading device which includes a light source and a pickup device which face each other with an original platen for holding an original interposed therebetween, receives light irradiated from the light source by the pickup device, and reads a light transmission original, the image reading device comprising: a pickup device movement mechanism which reciprocally moves the pickup device in a predetermined direction; a light source movement mechanism which reciprocally moves the light source in the predetermined direction in interlock with the reciprocal movement of the pickup device movement mechanism in a movement range which is set to be less than a movement distance of the pickup device; and a connection mechanism which has a torque limiter function for generating sliding between the light source movement mechanism and the pickup device movement mechanism when torque equal to or greater than a predetermined value is delivered, and interlockingly connects the light source movement mechanism to the pickup device movement mechanism.

Accordingly, in the image reading device, since the light source and the pickup device are interlockingly moved by a driving force of the same driving source, it is possible to prevent deterioration in original reading precision due to the shift in a relative position between the light source and the pickup device in the sub-scanning direction. Accordingly, it is possible to improve the reading precision of the image reading device, to downsize the light source movement mechanism, and to reduce power consumption of the image reading device.

In the image reading device, since the torque equal to or greater than the predetermined value is prevented from being delivered to the light source movement mechanism by the torque limiter function of the connection mechanism, it is possible to interlockingly move the pickup device and the light source having different movement loads by the driving force of the same driving source with high precision.

In the image reading device, since the light source is moved in the movement range which is set to be less than the movement distance of the pickup device, the light irradiated from the light source can be received by the pickup device with certainty and thus the deterioration in original reading precision due to lack of the amount of exposure can be prevented. Accordingly, it is possible to improve the reading precision of the image reading device, to downsize the light source movement mechanism, and to reduce power consumption of the image reading device.

By the image reading device according to the present invention, a user can obtain image data reproducing an image of the original with high precision using the small-sized image reading device with suppressed power consumption.

In the image reading device according to the present embodiment, the connection mechanism may interlockingly connect the light source movement mechanism to the pickup device movement mechanism by applying an attraction magnetic force having a value enough for generating sliding between the light source movement mechanism and the pickup device movement mechanism when the torque equal to or greater than the predetermined value is delivered.

In the image reading device, the light source movement mechanism and the pickup device movement mechanism can be interlockingly connected to each other using the attraction force of an object. Accordingly, in the image reading device, it is possible to downsize and simplify the connection mechanism. Thus, the user can obtain image data reproducing an image of the original with high precision using the small-sized image reading device with suppressed power consumption.

In the image reading device, a connection surface is made smooth by connecting the light source movement mechanism to the pickup device movement mechanism by the magnetic force. Accordingly, in the image reading device, it is possible to downsize and simplify the connection mechanism, in addition to the stability of the user. Thus, the user can obtain image data reproducing an image of the original with high precision using the small-sized image reading device with suppressed power consumption.

The image reading device according to the present invention may include a correction unit which corrects a relative position between the light source and the pickup device in a sub-scanning direction by reciprocally moving the pickup device before an original reading operation when reading of the original is instructed.

Accordingly, in the image reading device, the light source is reciprocally moved by the reciprocal movement of the pickup device before the original reading operation. Since the light source is reciprocally moved in the movement range which is set to be less than the movement distance of the pickup device, the light source reaches a position where a movement direction of the light source is changed or a position where the reciprocal movement of the light source is completed before the movement direction of the pickup device is changed from front reciprocation to back reciprocation or before the reciprocal movement of the pickup device is completed.

In the image reading device, the light source after reaching the position where the movement direction of the light source is changed or the position where the reciprocal movement of the light source is completed is positioned at the same position until the movement direction of the pickup device is changed or the reciprocal movement of the pickup device is completed, by the torque limiter function of the connection mechanism.

That is, in the image reading device, the relative position between the light source and the pickup device in the sub-scanning direction can be adjusted without using a sensor for adjusting the relative position between the light source and the pickup device in the sub-scanning direction, before the original reading operation.

Accordingly, in the image reading device, it is possible to prevent the deterioration in original reading precision due to shift in the relative position between the light source and the pickup device in the sub-scanning direction, to downsize the light source movement mechanism, and to reduce power consumption of the image reading device, without increasing manufacturing cost. Thus, the user can obtain image data reproducing an image of the original with high precision using the small-sized image reading device with suppressed power consumption.

In the image reading device according to the present invention, the light source may include a light-emitting diode (LED).

Accordingly, in the image reading device, the original can be read immediately after the light source is turned on and thus the amount of irradiated light can be stabilized compared with a case of using a fluorescent tube instead of the LED. Accordingly, the image reading device can rapidly start the reading of the original and improve the reading precision. Thus, the user can rapidly obtain image data with high precision.

Since the image reading device uses the LED, it is possible to suppress power consumption and running cost compared with a case of using the fluorescent tube instead of the LED. Accordingly, the user can obtain image data with high precision using the image reading device with low power consumption and low running cost.

A multi-function machine according to the present invention includes the image reading device and an image forming apparatus which forms an image according to the intensity of light incident to the pickup device included in the image reading device on a recording medium.

Accordingly, in the multi-function machine, the light source and the pickup device can be interlocked by the driving force of the same driving source. Accordingly, in the multi-function machine, it is possible to form the image reproducing the original with high precision on the recoding while suppressing the increase of power consumption and the enlargement of the multi-function machine. Thus, the user can obtain image data with high precision using the small-sized image reading device with suppressed power consumption.

DETAILED DESCRIPTION OF THE INVENTION

Embodiment 1

Hereinafter, an image reading device according to Embodiment 1 of the present invention will be described in detail with reference to the accompanying drawings. Embodiment 1 relates to a scanner device for realizing the image reading device according to the present invention.

Figure 1:
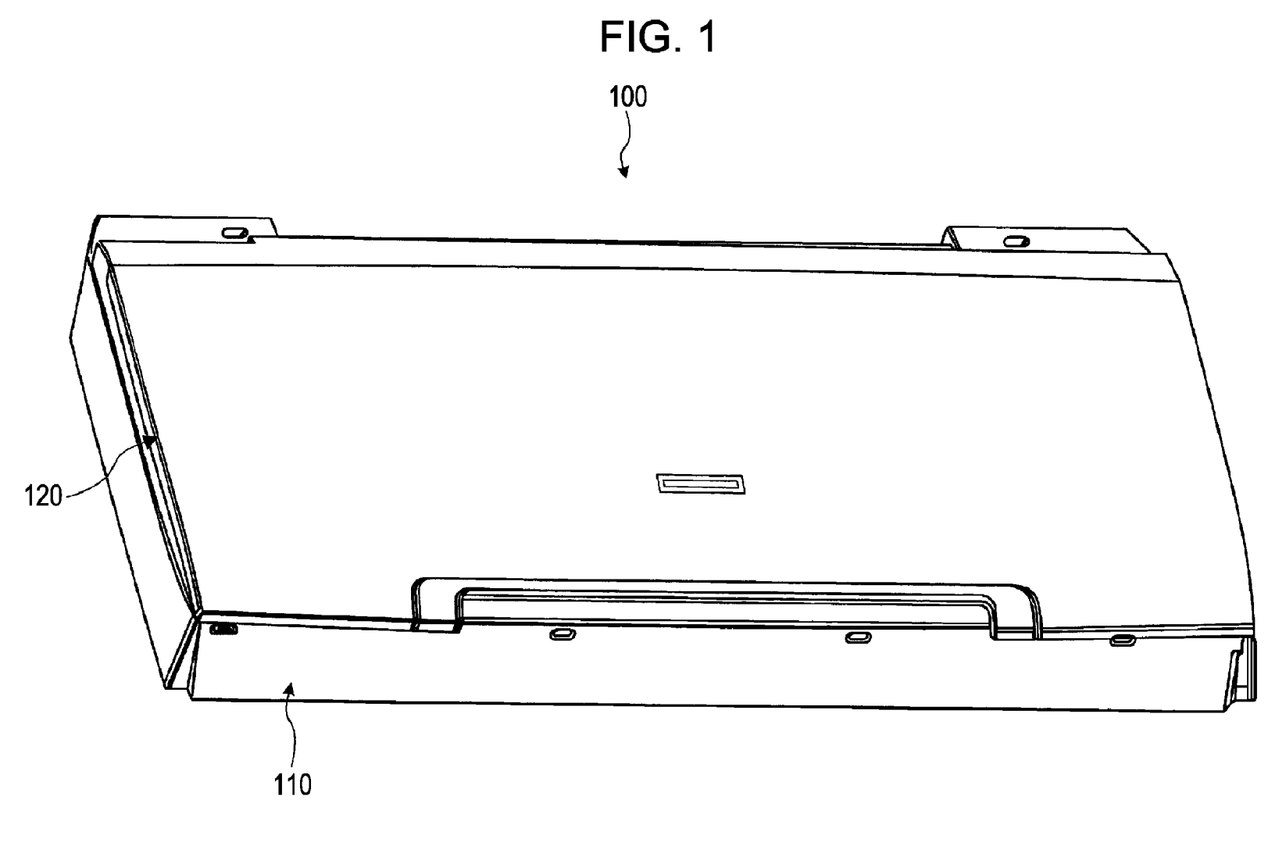
FIG. 1 is a perspective view showing an appearance of a scanner device according to Embodiment 1.

FIG. 1 is a perspective view showing an appearance of a scanner device according to Embodiment 1. First, the appearance of the scanner device according to Embodiment 1 will be described with reference to FIG. 1. As shown in FIG. 1, the scanner device 100 includes a main body unit 110 and a light source unit for a transmission original (hereinafter, referred to as a "TPU unit") 120.

Figure 3:
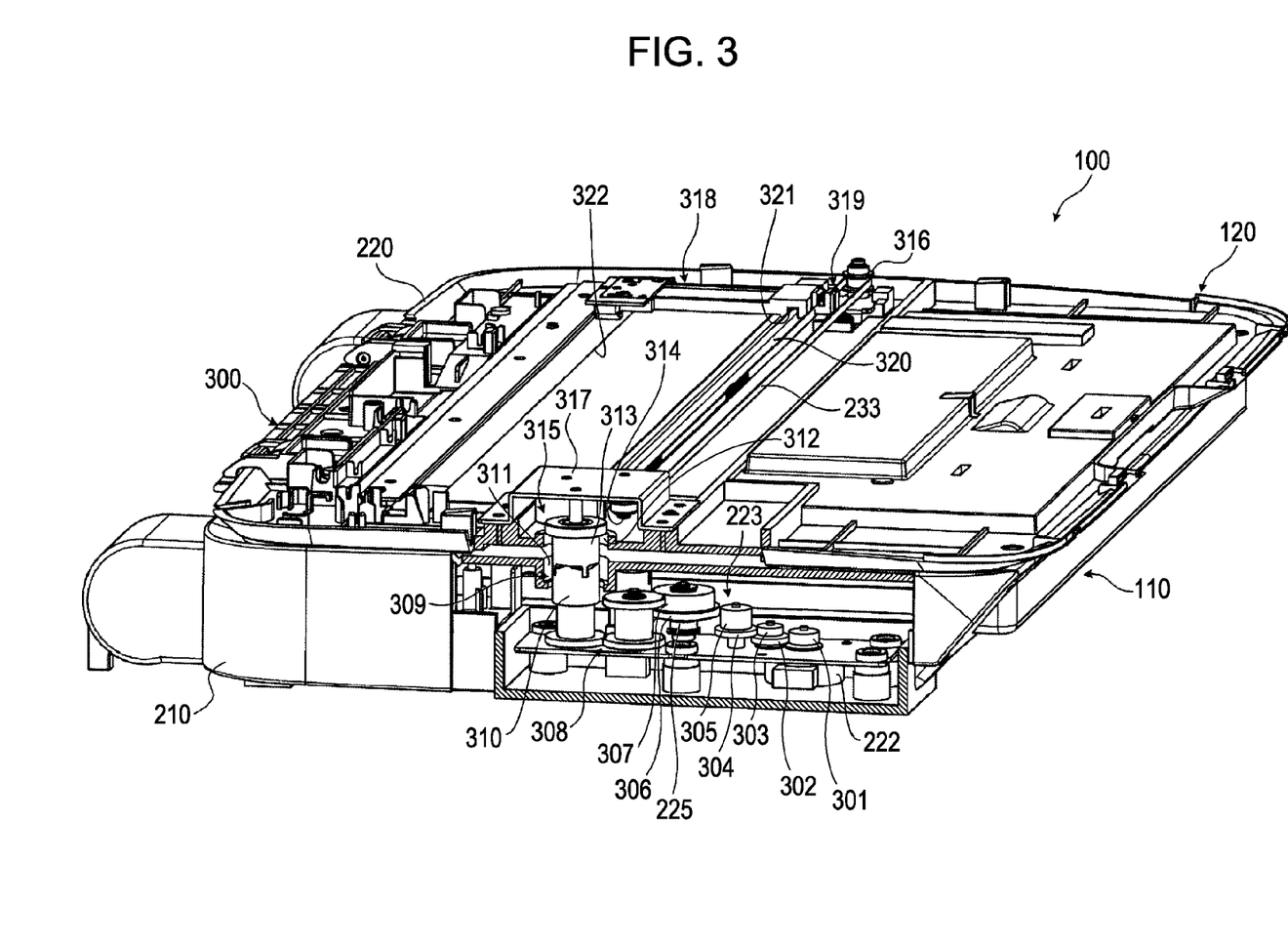
FIG. 3 is a perspective view showing the scanner device which is partially cut away.

The TPU unit 120 is opposed to the main body unit 110 and is connected to the main body unit 110 through a hinge portion (see FIG. 3). The TPU unit 120 is rotated around the hinge portion so as to be far away from the main body unit 110 in the state shown in FIG. 1.

Figure 2:
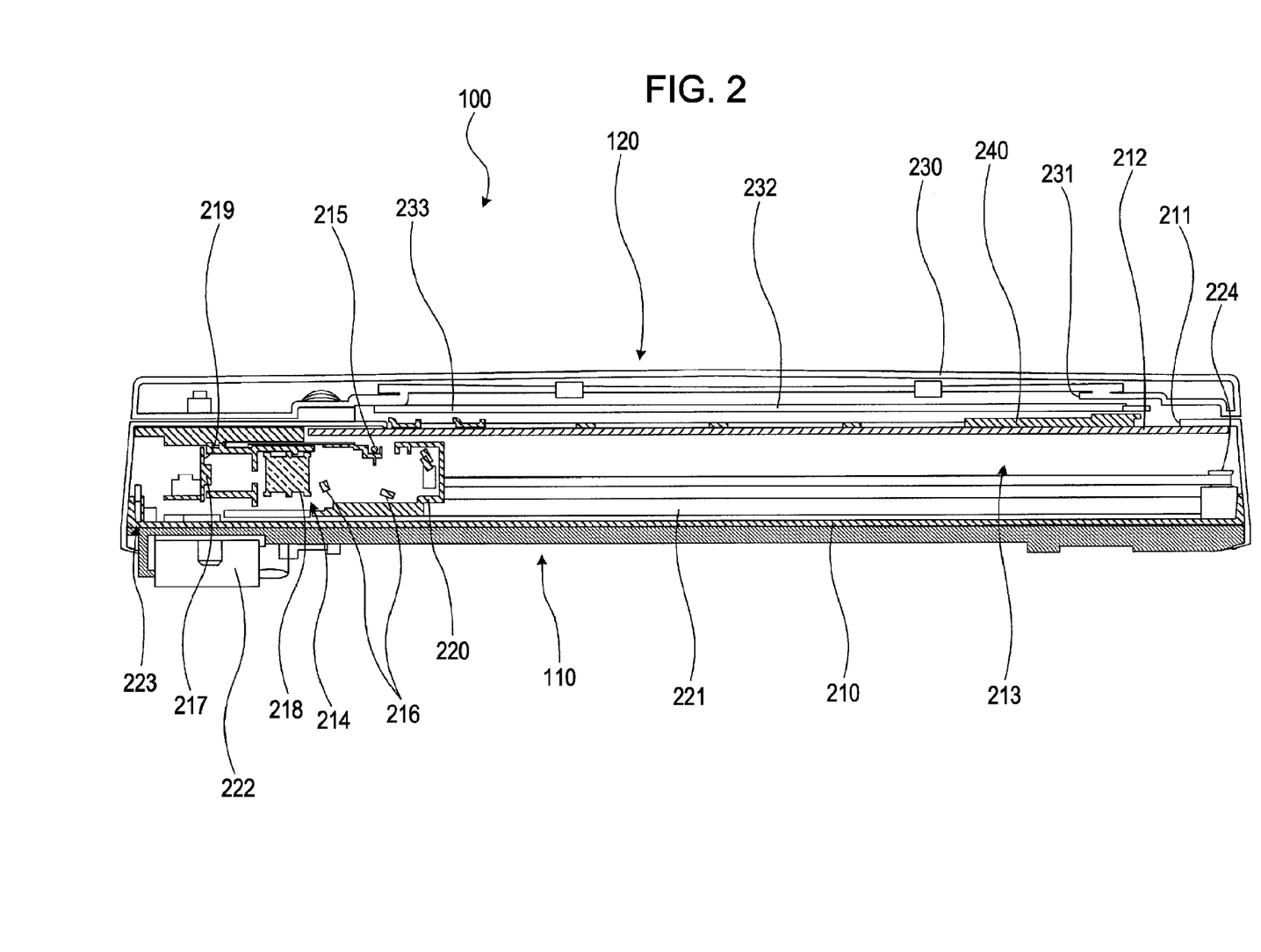
FIG. 2 is a front view showing the scanner device cut in a vertical direction.

FIG. 2 is a front view showing the scanner device 100 according to Embodiment 1 cut in a vertical direction. Next, the schematic configuration of the scanner device 100 according to Embodiment 1 will be described with reference to FIG. 2. As shown in FIG. 2, the scanner device 100 includes a main body housing 210 which forms the outer shape of the main body unit 110 and a TPU housing 230 which forms the outer shape of the TPU unit 120.

The main body housing 210 and the TPU housing 230 respectively include two parts which can be vertically separated. Although respective reference numerals of the parts are omitted, an upper part of the main body housing 210 and an upper part of the TPU housing 230 are respectively referred as to an upper main body housing and an upper TPU housing. Similarly, a lower part of the main body housing 210 and a lower part of the TPU housing 230 are respectively referred as to a lower main body housing and a lower TPU housing.

First, the schematic configuration of the main body unit 110 will be described. The main body housing 210 of the main body unit 110 includes an opening 211 which opens toward the TPU housing 230. Original platen glass 212 is mounted on the opening 211 so as to close the opening 211.

In Embodiment 1, a reading window is realized by the opening 211 and the original platen glass 212, and a frame member is realized by the periphery of the opening 211 of the main body housing 210. An original to be read is mounted on the original platen glass 212.

In a space 213 formed by the main body housing 210 and the original platen glass 212, an optical member 214 for optically reading an image of the original mounted on the original platen glass 212. The optical member 214 includes a reflection light source 215 for irradiating light toward the original platen glass 212, a plurality of mirrors 216 which guides the light irradiated from the reflection light source 215 and reflected from the original to a predetermined path, a pickup device 217 for receiving the light guided by the mirrors 216, and a lens 218 for focusing the light guided by the mirrors 216 on the pickup device 217.

The pickup device 217 may include, for example, a photodiode for convert an optical image formed on a light-receiving surface into an electric signal and outputting the electric signal according to a light-receiving amount of each device. In the scanner device 100, a linear image sensor in which the photodiode is linearly arranged on a scan circuit board 219 in a main scan direction is used as the pickup device 217.

A scanner carriage 220 is provided in the space 213. The scanner carriage 220 is parallel to the original platen glass 212 and is slidably provided along a carriage guide 221 which extends in a sub-scanning direction.

A driving force generated by a motor 222 which is a driving source is delivered to the scanner carriage 220 through a pickup device movement mechanism 223 connected to the motor 222. The motor 222 includes, for example, a stepping motor and has a function for controlling a driving amount.

As described later, the pickup device movement mechanism 223 includes a gear train connected to a driving shaft of the motor 222 and a driving belt 225 stretched between a gear configuring the gear train and a driven gear 224 (see FIG. 3). The scanner carriage 220 is connected to the driving belt 225.

When the driving force generated by the motor 222 is delivered to the scanner carriage 220 through the pickup device movement mechanism 223, the scanner carriage 220 is moved in the sub-scanning direction along the original platen glass 212. The scanner carriage 220 is reciprocally moved between a home position located at the end of a side where the reading of the original is started and a returning position for returning the scanner carriage to the home position after reading the original.

The optical member 214 is mounted on the scanner carriage 220. The optical member 214 is moved in the sub-scanning direction along the original platen glass 212 by the movement of the scanner carriage 220.

Next, the schematic configuration of the TPU unit 120 will be described. An operation 231 which opens toward the main body housing 210 is formed in the TPU housing 230 of the TPU unit 120 at a side opposite the main body housing 210. A protective mat 232 is provided on the TPU housing 230 so as to cover the opening 231. The protective mat 232 is detachably provided on the TPU housing 230.

A transmission light source portion (see FIG. 3) is provided in the TPU housing 230 as a light source for the transmission original. The transmission light source portion is used when reading the light transmission original such as a photographic film and irradiates light toward the original platen glass 212. The transmission light source portion is movably provided in the sub-scanning direction along the original platen glass 212.

A power delivering mechanism (see FIG. 3) is provided in the TPU housing 230 as a light source movement mechanism for delivering the driving force of the motor 222 to the transmission light source portion. Although not shown and described, the power delivering mechanism provided in the TPU unit 120 is configured by a group of pulleys connected to the pickup device movement mechanism 223 or a driving belt 233 and a pair of gears over which the driving belt 233 is stretched (see FIG. 3).

In Embodiment 1, the power delivering mechanism provided in the TPU housing 230 is connected to the motor 222 when the protective mat 232 is detached from the TPU housing 230 so as to deliver the driving force of the motor 222 to the transmission light source portion. Accordingly, when the protective mat 232 is detached from the TPU housing 230, the transmission light source portion and the scanner carriage 220 are moved in the sub-scanning direction by the driving force of the motor 222.

The transmission light source portion is reciprocally moved between a home position located at an end of the side where the irradiation of the light onto the original is started and a returning position for returning the transmission light source portion toward the home position after irradiating the light onto the original.

In an operation for reading the light transmission original (hereinafter, referred to as a film) such as a film, a film folder 240 is provided on the original platen glass 212, that is, between the main body unit 110 and the TPU unit 120. The film folder 240 is a member for guiding a film installation position so as to install the film at the film reading position of the original platen glass 212 and fixing the installed film at the reading position.

FIG. 3 is a perspective view showing the scanner device 100 which is partially cut away. In FIG. 3, the upper TPU housing is detached from the TPU housing 230 and a portion of the main body housing 210 is cut away. In FIG. 3, a reference numeral 300 is a hinge portion for connecting the main body unit 110 to the TPU unit 120. Hereinafter, the elements for delivering the driving force of the motor 222 will be described with reference to FIG. 3.

As shown in FIG. 3, the pickup device movement mechanism 223 provided in the main body housing 210 is configured by a gear 301 fixed to the driving shaft of the motor 222 and gear trains 302 to 306 connected to the gear 301. A gear over which the driving belt 225 is stretched is provided on a shaft which is a rotation shaft center of the gear 306.

The pickup device movement mechanism 223 delivers the driving force generated of the motor 222 to the driving belt 225 through the gears 301 to 306 so as to rotate the driving belt 225. Accordingly, the scanner carriage 220 connected to the driving belt 225 can be moved in the sub-scanning direction.

A pulley 307 which is rotated around the shaft is provided on the shaft which is the rotation shaft center of the gear 306. A magnetic body 310 configuring a portion of the connection mechanism 309 through a plurality of pulley groups 308 which rotate by the rotation of the pulley 307 is connected to the pulley 307. The magnetic body 310 receives the driving force of the motor 222 through the pulley groups 308 and rotates around the shaft center parallel to a shaft center direction of the pulley groups 308.

The magnetic body 310 faces a magnetic body 313 provided in the TPU unit 120 through openings 311 and 312 which open toward the TPU unit 120 in the upper surface of the main body housing 210. The magnetic body 310 and the magnetic body 313 are connected to each other such that the magnetic bodies 310 and 320 can be disconnected from each other by an attraction force. The connection mechanism 309 is configured by the pulley 307, the pulley groups 308, the magnetic body 310, and the openings 311 and 312. The magnetic body 313 is provided so as to be rotated around the shaft center parallel to the shaft center direction of the magnetic body 310.

The magnetic bodies 310 and 313 configuring the connection mechanism 309 may have magnetic forces which attract each other or any one of the magnetic bodies 310 and 313 may have a magnetic force which attracts the other of the magnetic bodies. If any one of the magnetic bodies 310 and 313 has the magnetic force, the other of the magnetic bodies is formed of a material having a property attracted by the magnetic force, such as iron.

A pulley group 315 for connecting one gear 314 of a pair of gears stretched over the driving belt 233 to the magnetic body 313 is provided in the TPU housing 230. The other gear 316 of the pair of the gears is rotated by the rotation of the driving belt 233. The gear 314 and the gear 316 face each other in the sub-scanning direction. The power delivering mechanism which is the light source movement mechanism is configured by the driving belt 233 and the gears 314 and 316.

The connection mechanism 309 has a torque limiter function for generating sliding between the magnetic body 310 and the magnetic body 313 when a torque delivered from the pickup device movement mechanism 223 is greater than a torque having a predetermined value such that the torque equal to or greater than the predetermined value is not delivered to the pulley group 315. Here, the torque having the predetermined value is a torque necessary for moving the transmission light source portion.

Even when the torque equal to or greater than the predetermined value is delivered by the torque limiter function of the connection mechanism, it is possible to prevent the elements related to the movement of the transmission light source portion, such as the transmission light source portion, the pulley group 315 or the pair of gears over which the driving belt 233 is stretched, from being damaged.

In FIG. 3, a reference numeral 317 denotes a stay for supporting the shaft of the gear 314 and the pulley configuring the pulley group 315, and the magnetic body 313. The magnetic body 313 is provided so as to come close to and away from the stay 317 (see FIGS. 5 and 6). Accordingly, the magnetic body 310 can be separately connected to the magnetic body 313.

In FIG. 3, a reference numeral denotes the transmission light source portion. The transmission light source portion 318 is connected to the driving belt 233 in a fixing portion 319 provided in the transmission light source portion 318. Accordingly, the transmission light source portion 318 is moved in the sub-scanning direction by the rotation of the driving belt 233.

In the TPU housing 230, a guide rail 320 which extends in the sub-scanning direction is provided aside the driving belt 233 so as to overlap a movement path of the transmission light source portion 318. The guide rail 320 is inserted into a groove 321 provided in the transmission light source portion 318 at a position opposite the guide rail 320. Accordingly, it is possible to stably move the transmission light source portion 318 in the sub-scanning direction.

The light irradiated from the transmission light source portion 318 is guided to the original platen glass 212 through the opening 322 provided in the TPU housing 230. The opening 322 is provided so as to cover a film reading range of the transmission light source portion 318.

Figure 4:
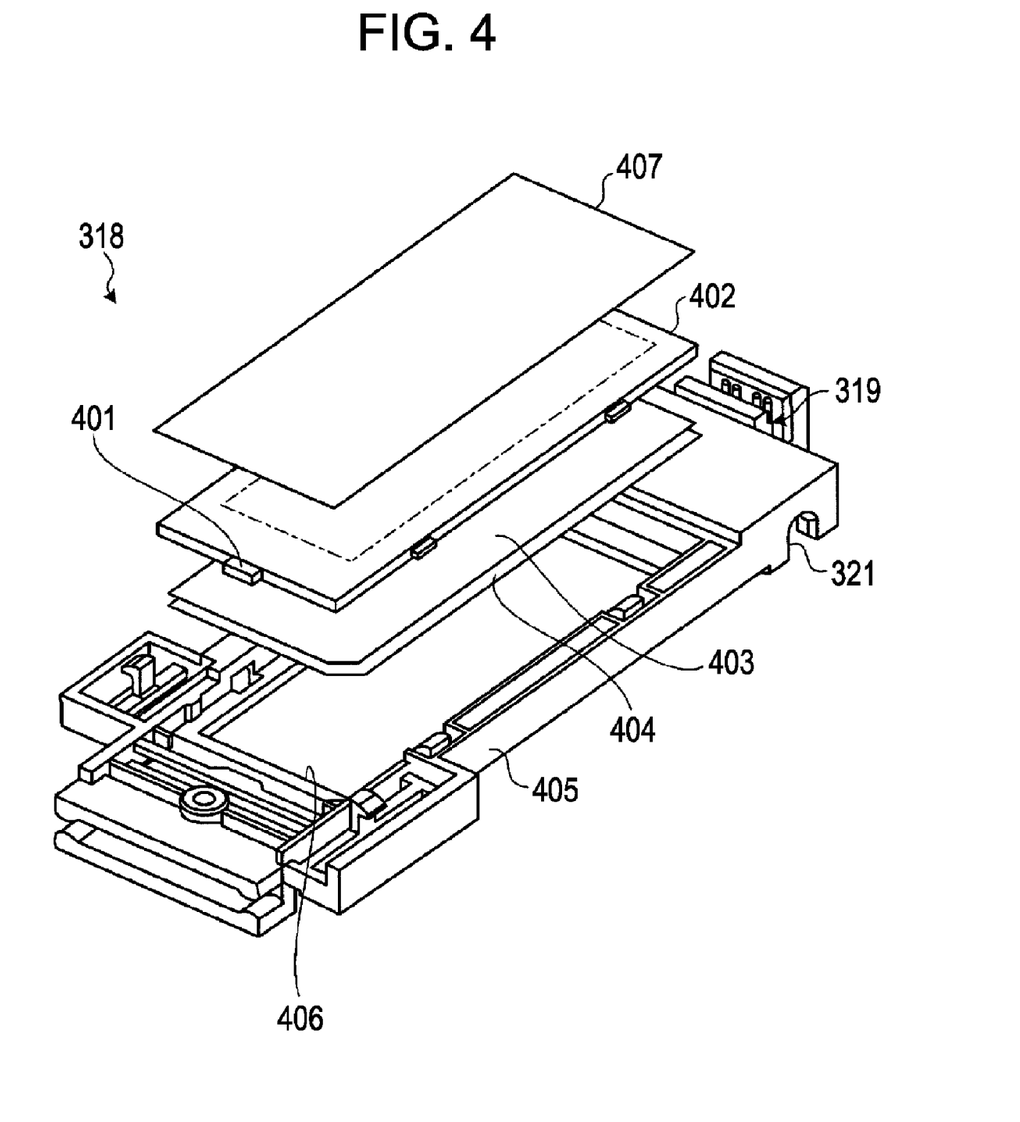
FIG. 4 is an exploded perspective view showing a transmission light source portion.

FIG. 4 is an exploded perspective view showing the transmission light source portion 318. The configuration of the transmission light source portion 318 will be described with reference to FIG. 4. As shown in FIG. 4, the transmission light source portion 318 includes a light-emitting diode (LED) 401 and a light guide plate 402 for propagating the light emitted from the LED 401. By the light guide plate 402, the light can be irradiated over an area wider than an area per LED. In FIG. 4, a dotted line marked on the light guide plate 402 indicates a valid light emission area in the light guide plate 402.

The light propagated in the light guide plate 420 is irradiated from an opening 406 provided in a support frame 405 to the original platen glass 212 through a prism sheet 403 and a diffusion sheet 404. By the prism sheet 403 and the diffusion sheet 404, the light can be irradiated over an area wider than that of the light propagated in the light guide plate 402.

In the transmission light source portion 318, a reflection plate 407 for reflecting the light propagated in the light guide plate 402 toward the opening 406 is provided opposite the opening 406 with the light guide plate 402 interposed therebetween. By providing the reflection plate 407, it is possible to irradiate the light propagated in the light guide plate 402 to the original platen glass 212. The fixing portion 319 is provided aside the support frame 405 and is opened upward such that the driving belt 233 is inserted from the original platen glass 212.

Figure 5:
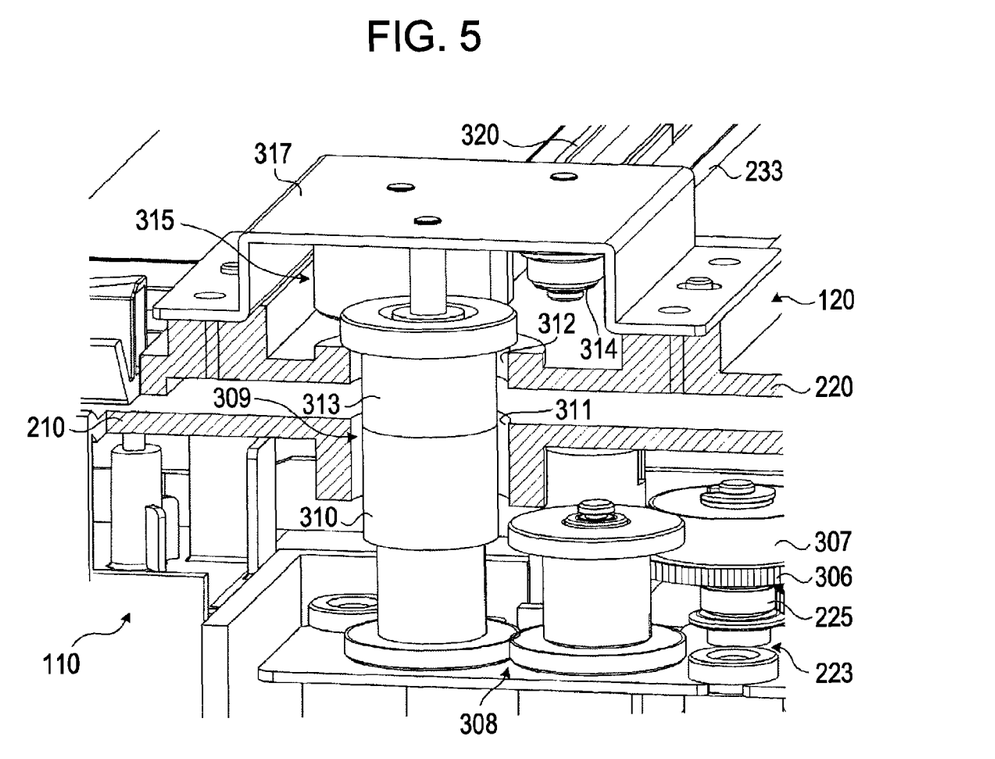
FIG. 5 is an enlarged perspective view (1) of a connection mechanism.
Figure 6:
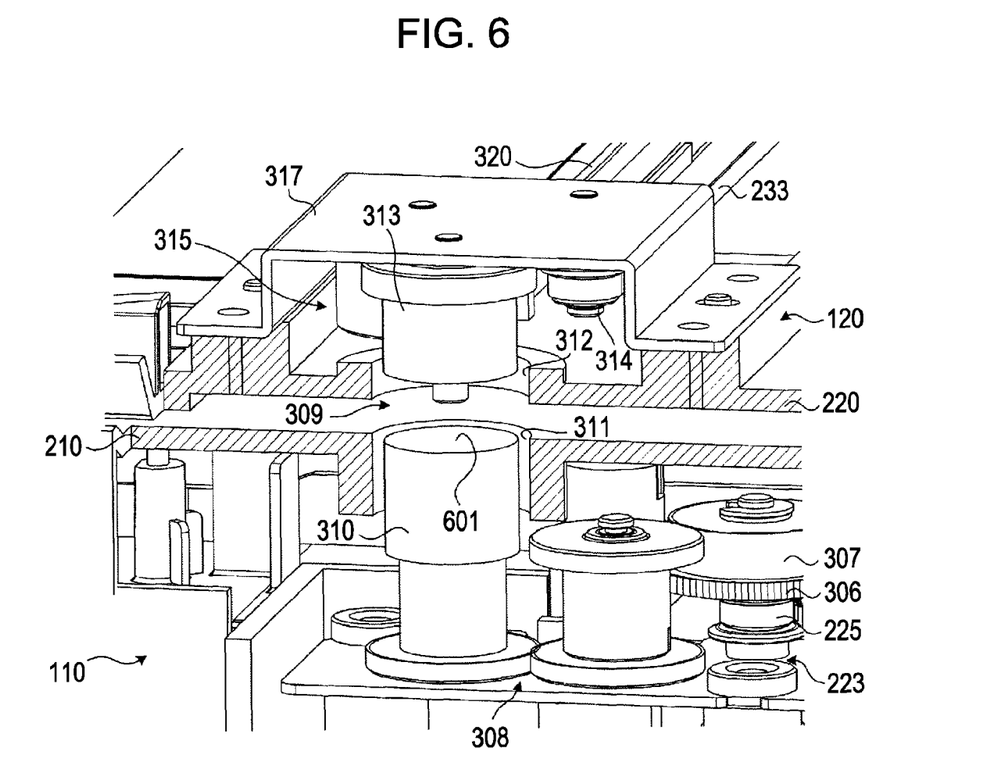
FIG. 6 is an enlarged perspective view (2) of the connection mechanism.

FIG. 5 is an enlarged perspective view (1) of the connection mechanism 309, and FIG. 6 is an enlarged perspective view (2) of the connection mechanism 309. FIG. 5 shows a state in which the magnetic body 310 and the magnetic body 313 are connected to each other by the magnetic force. FIG. 6 shows a state in which the magnetic body 310 and the magnetic body 313 are separated from each other.

As can be seen from FIGS. 5 and 6, the magnetic body 313 of the connection mechanism 309 is connected to the magnetic body 310 when being separated from the stay 317 and is separated from the magnetic body 310 when being located in the vicinity of the stay 317. The facing surfaces of the magnetic bodies 310 and 313 are planes (see a reference number 601). Accordingly, it is possible to widen a plane to which an attraction force is applied and to adhere the magnetic body 310 closely to the magnetic body 313 such that the magnetic body 310 can be connected to the magnetic body 313 with certainty.

Since the facing surfaces of the magnetic bodies 310 and 313 are the planes, it is possible to remove danger generated when the hand of a user reaches to a connection portion of the connection mechanism 309 and to ensure stability of the user.

Although not shown, the scanner device 100 includes an operation panel for receiving a variety of instructions of the user, a variety of control circuits for controlling the elements of the scanner device 100, and a control system for controlling the variety of control circuits according to the instruction received by the operation panel, in addition to the above-described configuration. The operation panel receives an instruction for reading an image of an original (reflective original) which does not transmit light, such as paper, and an instruction for reading an image of a film.

Although not shown, the scanner device 100 may include a communication I/F for performing communication with an external device such as a personal computer. In this case, the scanner device 100 receives a command according to the instruction received by the personal computer through the communication I/F.

The scanner device 100 moves the scanner carriage 220, turns on/off the reflection light source 215 or the transmission light source 318, or converting the light obtained by the pickup device 217 into an electric signal to generate image data, according to the instruction received through the operation panel or the command received through the command I/F. In Embodiment 1, the function of image data generation means is realized by elements for generating the image data and a variety of processes performed by the elements.

In the scanner device 100, the generated image data may be stored in any storage medium or may be transmitted to the external device such as the personal computer through the communication I/F. In Embodiment 1, the function of output means is realized by elements for transmitting the generated image data to the external device and a variety of processes performed by the elements.

When the image of the film is read by the scanner device 100 including the above-described configuration, the user installs a film folder 240 on the original platen glass 212 and installs a film at a predetermined position guided by the film folder 240. The user detaches the protective mat 232 from the TPU housing 230 before or after installing the film.

Subsequently, as shown in FIG. 1 or FIG. 2, the TPU unit 120 faces the main body unit 110. Accordingly, in the connection mechanism 309, the magnetic body 310 faces the magnetic body 313 and the transmission light source portion 318 is connected to the pickup device movement mechanism 223 by an attraction magnetic force between the magnetic body 310 and the magnetic body 313.

Thereafter, the user gives an instruction for reading an image of a film. The instruction may be given through the operation panel included in the scanner device 100 and may be given through the external device such as the personal computer.

When the instruction for reading the image of the film is given, the scanner device 100 drives the motor 222, moves the scanner carriage 220 and the transmission light source portion 318 in the sub-scanning direction, and detects the amount of light received by the pickup device 217. The image data is generated on the basis of the amount of the received light.

In the scanner device 100, the generated image data may be stored in any storage medium or may be transmitted to the external device such as the personal computer through the communication I/F.

The scanner device 100 may acquire a variety of reference data which is a black or white reference of the image data before generating the image data and perform shading correction of the image data using the acquired reference data. The acquisition of the reference data and the shading correction using the acquired reference data are known and thus the description thereof will be omitted.

The scanner device 100 according to Embodiment 1 performs a correction process of correcting the relative position between the transmission light source portion 318 and the pickup device 217 before generating the image data. Hereinafter, the correction process of correcting the relative position between the transmission light source portion 318 and the pickup device 217 will be described with reference to FIGS. 7 to 11.

FIGS. 7 to 11 are views (1 to 5) explaining a correction process. FIGS. 7 to 11 show the correction process when the transmission light source portion 318 is positioned at the returning position rather than the pickup device 217. In FIGS. 7 to 11, portions of the reference numerals are omitted compared with FIG. 2.

In FIGS. 7 to 11, the home position of the transmission light source portion 318 is a position where the transmission light source portion 318 contacts a positioning member denoted by a reference numeral 710. The returning position of the transmission light source portion 318 is a position where the transmission light source portion 318 bumps into a positioning member denoted by a reference numeral 720.

The home position of the scanner carriage 220 is a position where the scanner carriage 220 is detected by a sensor (not shown) provided in the main body housing 210. The returning position of the scanner carriage 220 is a position where the motor 222 is driven from the home position of the scanner carriage 220 toward the returning position by a predetermined amount.

Figure 7:
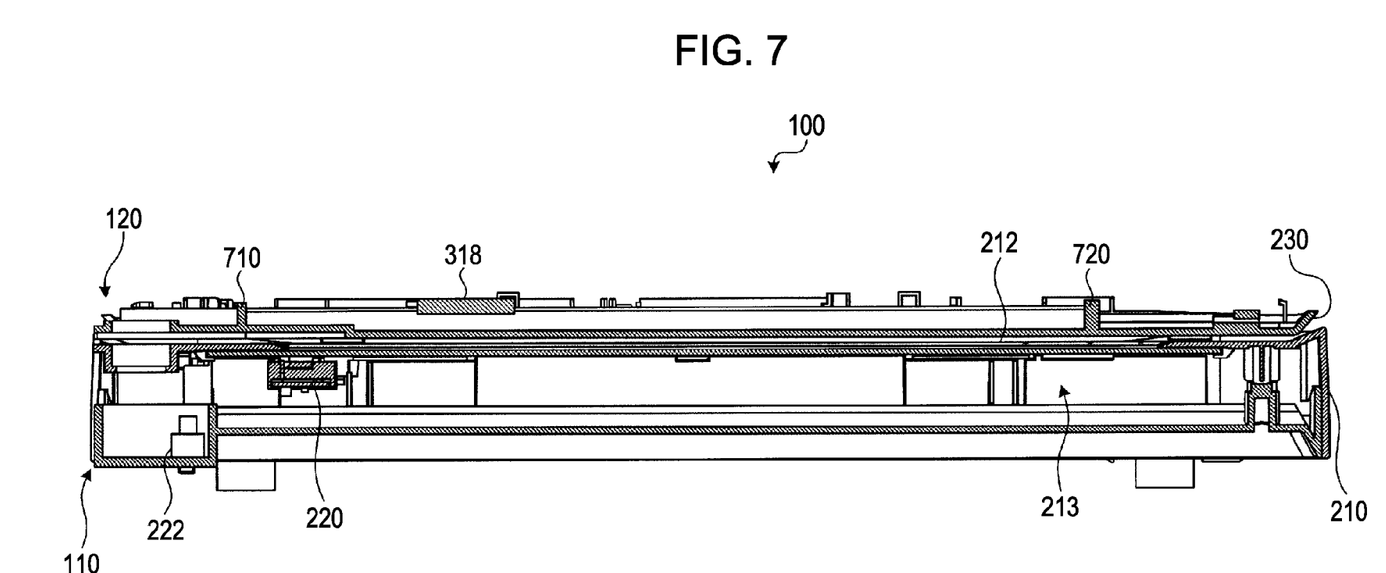
FIG. 7 is a view (1) explaining a correction process.

FIG. 7 shows a state in which the correction process is started. In the correction process, first, the motor 222 is driven in a state in which the power delivering mechanism provided in the TPU unit 120 is connected to the motor 222 so as to move the scanner carriage 220 to the returning position. At this time, since the power delivering mechanism provided in the TPU unit 120 is connected to the pickup device movement mechanism 223 by the connection mechanism 309, the transmission light source portion 318 is moved toward the returning position of the transmission light source portion 318 in interlock with the movement of the scanner carriage 220 to the returning position.

As described above, in the scanner device 100, a distance between the home position and the returning position of the scanner carriage 220 is larger than a distance between the home position and the returning position of the transmission light source portion 318, the transmission light source portion 318 bumps into with the returning position of the transmission light source portion 318 while the scanner carriage is moved to the returning position.

Figure 8:
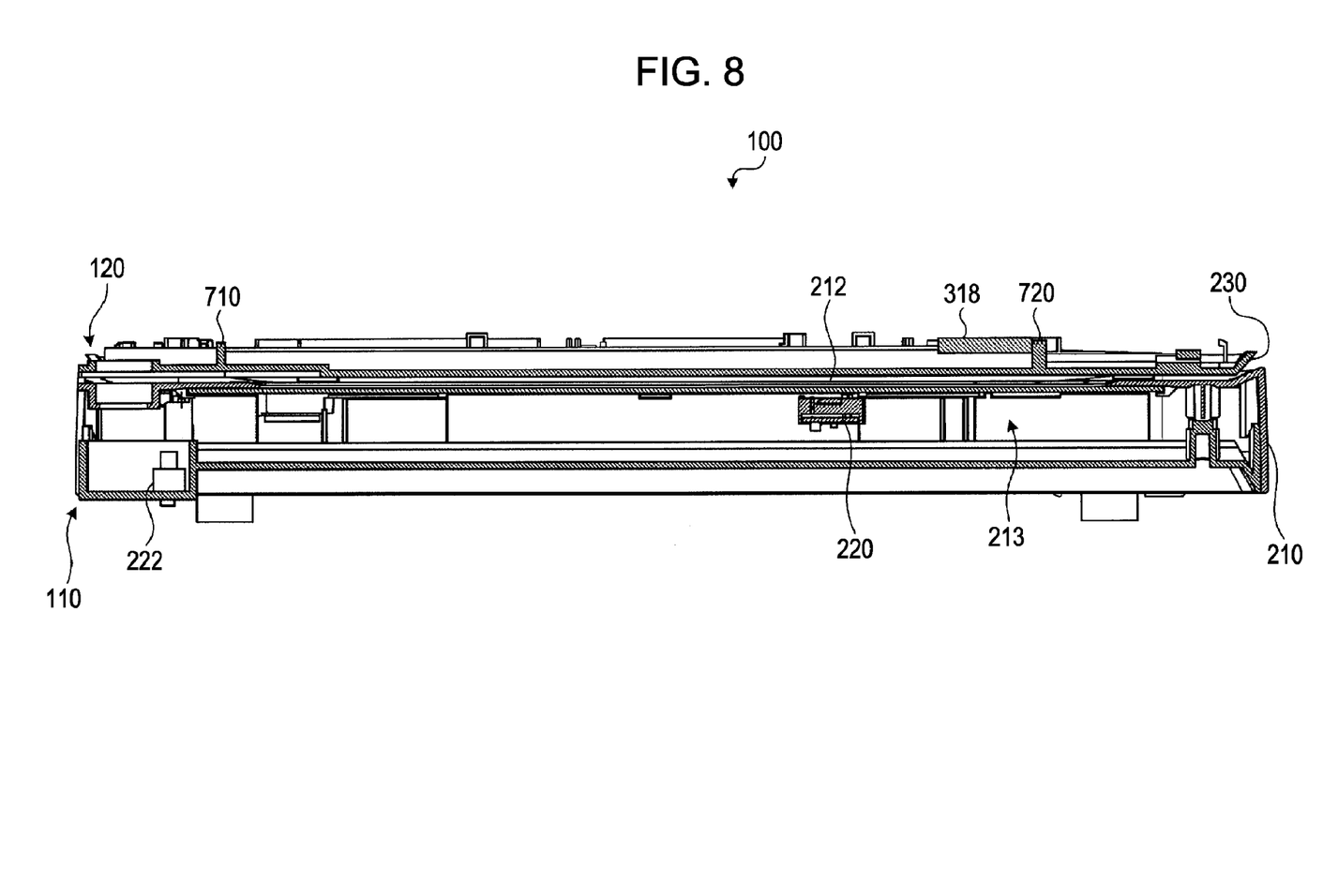
FIG. 8 is a view (2) explaining the correction process.

FIG. 8 shows a state in which the transmission light source portion 318 bumps into the returning position of the transmission light source portion 318. In the state shown in FIG. 8, when the motor 222 is driven again, only the scanner carriage 220 is moved to the returning position in a state in which the transmission light source portion 318 is positioned at the returning position by the torque limiter function of the connection mechanism 309.

Figure 9:
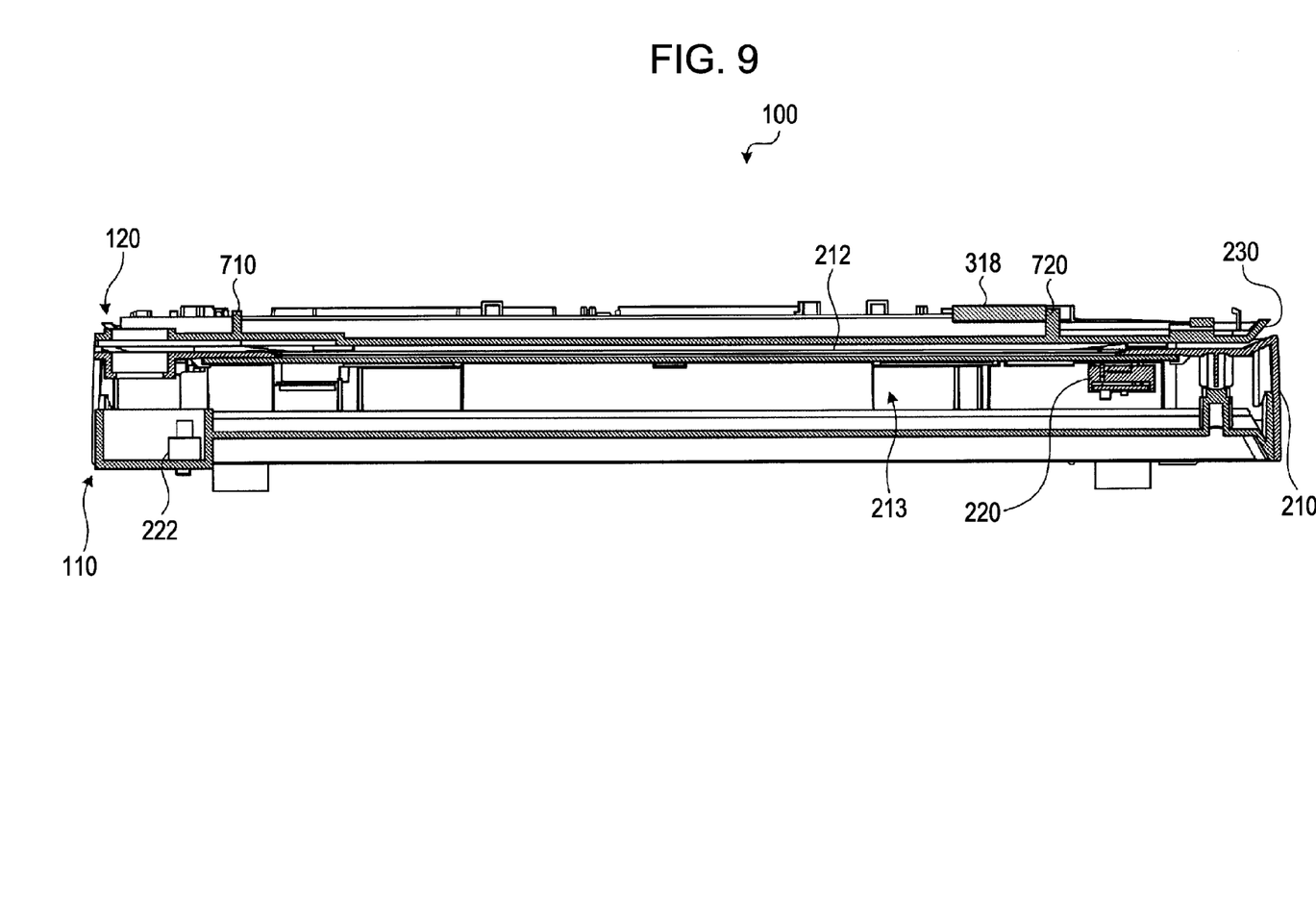
FIG. 9 is a view (3) explaining the correction process.

FIG. 9 shows a state in which the scanner carriage 220 bumps into the returning position. In the correction process, subsequently, the motor 222 is reversely rotated in the state shown in FIG. 9 such that the transmission light source portion 318 and the scanner carriage 220 are moved from the returning position to the home position.

Figure 10:
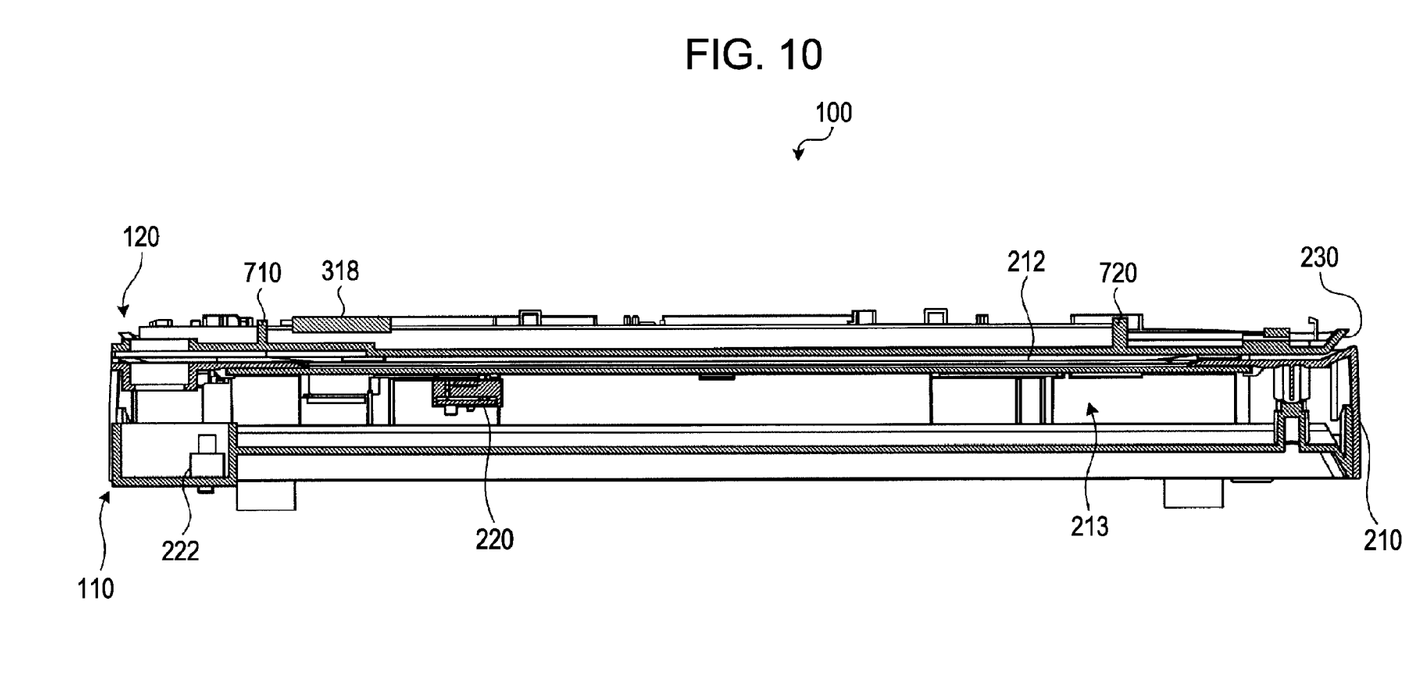
FIG. 10 is a view (4) explaining the correction process.

As described above, since the power delivering mechanism provided in the TPU unit 120 is connected to the motor 222, the transmission light source portion 318 is moved to the home position of the transmission light source portion 318 in interlock with the movement of the scanner carriage 220 to the home position. FIG. 10 shows a state in which the scanner carriage 220 and the transmission light source portion 318 are interlockingly moved to the respective home position.

In the scanner device 100, since the distance between the home position and the returning position of the scanner carriage 220 is larger than the distance between the home position and the returning position of the transmission light source portion 318, the transmission light source portion 318 bumps into the home position of the transmission light source portion 318 while the scanner carriage 220 is moved to the home position, as described above.

Figure 11:
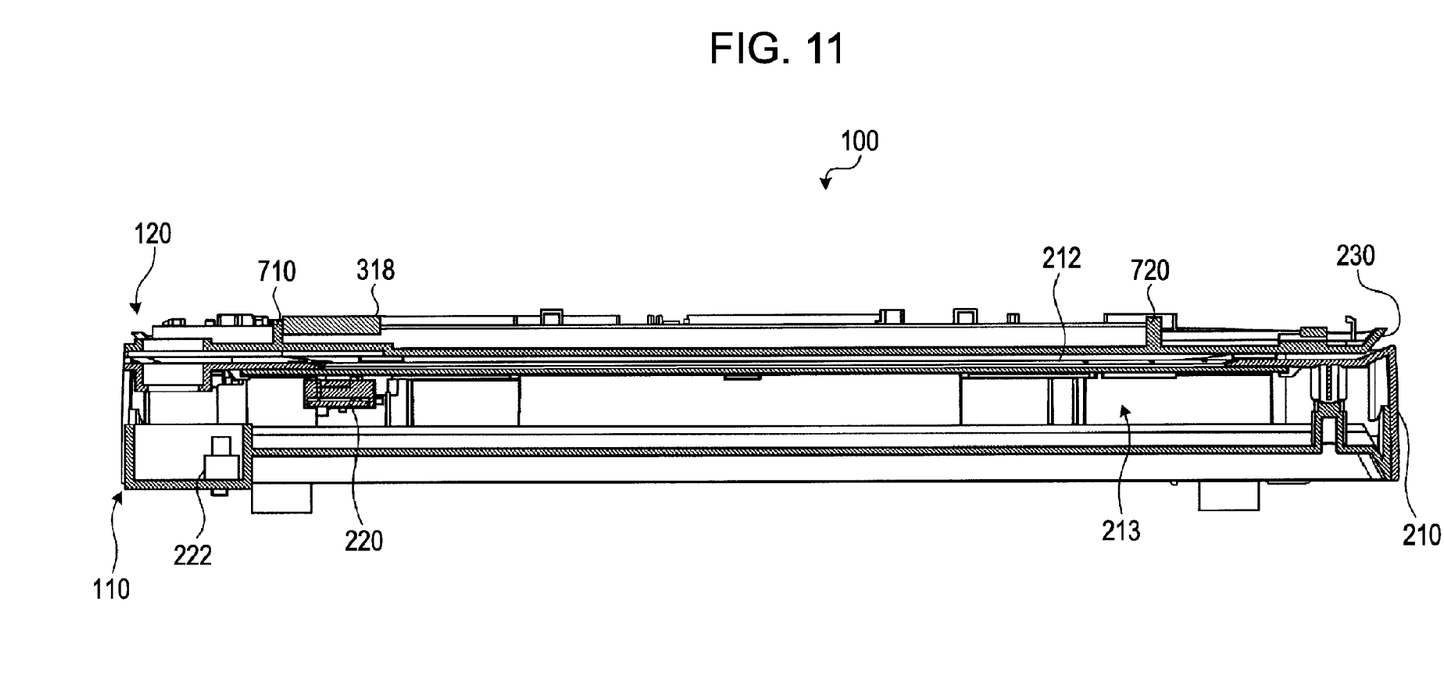
FIG. 11 is a view (5) explaining the correction process.

When the motor 222 is driven again in this state, only the scanner carriage 220 is moved to the home position in a state in which the transmission light source portion 318 is positioned at the home position, by the torque limiter function of the connection mechanism 309. FIG. 11 shows a state in which the transmission light source portion 318 and the scanner carriage 220 bump into the home position. The correction process is finished when the scanner carriage 220 is moved to the home position, as shown in FIG. 11.

The movement of the scanner carriage 220 to the returning position or the home position can be detected by providing a sensor at a predetermined position. The sensor for detecting the position of the scanner carriage 220 and a technology of detecting the position of the scanner carriage 220 using the sensor are known and thus will be omitted.

As described above, according to the scanner device 100 of Embodiment 1, the transmission light source portion 318 and the pickup device 217 can be interlockingly moved by the driving force of a single motor 222. Accordingly, in the scanner device 100, it is possible to prevent deterioration of original reading precision due to the shift in the relative position between the transmission light source portion 318 and the pickup device 217 in the sub-scanning direction at the time of movement, to downsize the power delivering mechanism, and to reduce power consumption of the scanner device 100.

In the scanner device 100, it is possible to prevent the torque equal to or greater than the predetermined value from be delivered to the power delivering mechanism by the torque limiter function of the connection mechanism 309 and to interlock the pickup device 217 and the transmission light source portion 318 having different loads by the driving force of the single motor 222 with high precision.

In the scanner device 100, since the transmission light source portion 318 is moved in a movement range which is set to be less than a movement distance of the pickup device 217, the light irradiated from the transmission light source portion 318 can be received by the pickup device 217 with certainty. Accordingly, it is possible to prevent deterioration of the original reading precision due to lack of the amount of light, to downsize the power delivering mechanism, and to reduce power consumption of the scanner device 100.

According to the scanner device 100 of the present invention, the user can obtain image data reproducing the image of the original with high precision using the small-sized scanner device with low power consumption.

According to the scanner device 100 of Embodiment 1, the power delivering mechanism can be interlockingly connected to the pickup device movement mechanism 223 using the attraction force of the magnetic bodies 310 and 313. Accordingly, in the scanner device 100, it is possible to downsize and simplify the connection mechanism 309. Thus, the user can obtain the image data reproducing the image of the original with high precision using the small-sized scanner device 100 with low power consumption.

According to the scanner device 100 of Embodiment 1, a connection surface (see a reference numeral 601 of FIG. 6) can be made smooth by connecting the power delivering mechanism to the pickup device movement mechanism 223 by the magnetic force. Accordingly, in the scanner device 100, it is possible to downsize and simplify the connection mechanism 309 in addition to the stability of the user. Thus, the user can stably use the small-sized scanner device 100 with low power consumption and obtain the image data reproducing the image of the original with high precision.

According to the scanner device 100 of Embodiment 1, since the transmission light source portion 318 is reciprocally moved by the reciprocal movement of the pickup device 217 before the original reading operation, it is possible to correct the relative position between the transmission light source portion 318 and the pickup device 217 in the sub-scanning direction without using a sensor for correcting the relative position between the transmission light source portion 318 and the pickup device 217 in the sub-scanning direction.

Accordingly, the scanner device 100 can prevent the deterioration of the original reading precision due to the shift in the relative position between the transmission light source portion 318 and the pickup device 217 in the sub-scanning direction without increasing manufacturing cost, can downsize the scanner device 100, and can reduce power consumption of the scanner device. Accordingly, the user can obtain image data reproducing the image of the original with high precision using the small-sized scanner device 100 with low power consumption.

According to the scanner device 100 of Embodiment 1, since the transmission light source portion 318 is configured by the LED 401, it is possible to read the original immediately after turning on the LED 401. Thus, it is possible to stabilize the amount of irradiated light compared with a case of using a fluorescent tube instead of the LED 401. Therefore, in the scanner device 100, it is possible to rapidly start the reading of the original and to improve the reading precision. Accordingly, the user can rapidly obtain image data with high precision.

According to the scanner device 100 of Embodiment 1, since the transmission light source portion 318 is configured by the LED 401, it is possible to suppress power consumption and running cost compared with a case of using a fluorescent tube instead of the LED 401. Accordingly, the user can obtain image data with high precision using the scanner device 100 with low power consumption and low running cost.

Although, in Embodiment 1, sliding is generated between the magnetic body 310 and the magnetic body 313 of the connection mechanism 309 to realize the torque limiter function when the torque equal to or greater than the predetermined value is delivered from the pickup device movement mechanism 223 to the elements related to the movement of the transmission light source portion 318, the realization of the torque limiter function is not limited to the use of the magnetic force.

Although not shown, for example, when a pair of gears is provided instead of the magnetic body 310 and the magnetic body 313 such that the torque equal to or greater than the predetermined value is delivered from the pickup device movement mechanism 223 to the elements related to the movement of the transmission light source portion 318, the torque limiter function may be realized by making any one of the pair of gears idle.

The idle gear is not limited to the pair of gears which is provided instead of the magnetic body 310 and the magnetic body 313 and, for example, any pulley configuring the group of the plurality of pulleys 308 may be made idle. The method of making the gear idle when the torque equal to or greater than the predetermined value is delivered is known and thus the description thereof will be omitted.

Embodiment 2

Next, a multi-function machine according to Embodiment 2 of the present invention will be described in detail with reference to the accompanying drawing. Embodiment 2 relates to an example of the multi-function machine according to the present invention. In Embodiment 2, the same parts as Embodiment 1 are represented by same reference numerals and thus the description thereof will be omitted.

Figure 12:
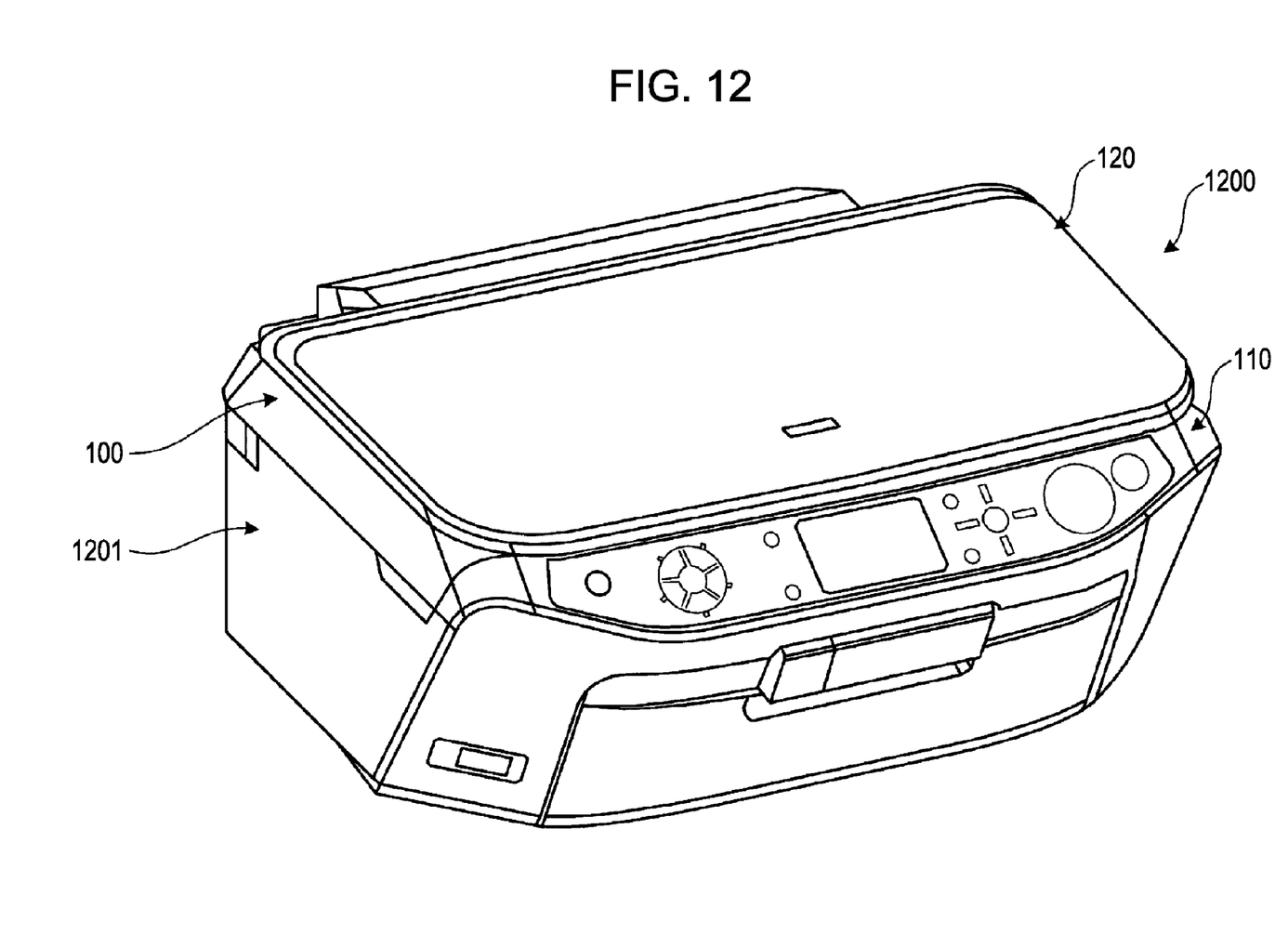
FIG. 12 is a perspective view showing a multi-function machine according to Embodiment 2.

FIG. 12 is a perspective view showing the multi-function machine according to Embodiment 2. The multi-function machine 1200 according to Embodiment 2 includes the scanner device 100 according to Embodiment 1 or Embodiment 2 and a printer 1201 which is an image forming apparatus for forming an image on a recoding medium according to the intensity of light incident to the pickup device 217 included in the scanner device 100.

The scanner device 100 is connected to the printer 1201 via a communication I/F (not shown). The scanner device 100 outputs image data according to the intensity of the light incident to the pickup device 217 to the printer 1201.

The printer 1201 includes a printer engine for forming an image on the recording medium such as paper. Although the known technology is not shown and described, an image forming method may includes a variety of methods such as an ink jet method, an electrostatic transfer method and a sublimation transfer method.

In the multi-function machine 1200 including the above configuration, the printer 1201 forms an image on the recording medium such as paper on the basis of the image data output from the scanner device 100.

According to the multi-function machine 1200, the transmission light source portion 318 and the pickup device 217 of the scanner device 100 are interlocked by the driving force of the single motor 222. Accordingly, the multi-function machine 1200 can form an image reproducing the original with high precision on the recording medium such as paper while suppressing the increase of power consumption and the enlargement of the multi-function machine 1200. Thus, the user can obtain image data with high precision using the small-sized multi-function machine 1200 with suppressed power consumption.

The invention claimed is:

1. An image reading device which includes a light source and a pickup device which face each other with an original platen for holding an original interposed therebetween, receives light irradiated from the light source by the pickup device, and reads a light transmission original, the image reading device comprising:
   a pickup device movement mechanism which reciprocally moves the pickup device in a predetermined direction;
   a light source movement mechanism which reciprocally moves the light source in the predetermined direction in interlock with the reciprocal movement of the pickup device movement mechanism in a movement range which is set to be less than a movement distance of the pickup device; and
   a connection mechanism which has a torque limiter function for generating sliding between the light source movement mechanism and the pickup device movement mechanism when torque equal to or greater than a predetermined value is delivered, and interlockingly connects the light source movement mechanism to the pickup device movement mechanism.

2. The image reading device according to claim 1, wherein the connection mechanism interlockingly connects the light source movement mechanism to the pickup device movement mechanism by applying an attraction magnetic force having a value enough for generating sliding between the light source movement mechanism and the pickup device movement mechanism when the torque equal to or greater than the predetermined value is delivered.

3. The image reading device according to claim 2, further comprising a correction unit which corrects a relative position between the light source and the pickup device in a sub-scanning direction by reciprocally moving the pickup device before an original reading operation when reading of the original is instructed.

4. The image reading device according to claim 3, wherein the light source includes a light-emitting diode (LED).

5. A multi-function machine comprising:
   an image reading device which includes a light source and a pickup device which face each other with an original platen for holding an original interposed therebetween, receives light irradiated from the light source by the pickup device, and reads a light transmission original, the image reading device including:
      a pickup device movement mechanism which reciprocally moves the pickup device in a predetermined direction,
      a light source movement mechanism which reciprocally moves the light source in the predetermined direction in interlock with the reciprocal movement of the pickup device movement mechanism in a movement range which is set to be less than a movement distance of the pickup device, and
      a connection mechanism which has a torque limiter function for generating sliding between the light source movement mechanism and the pickup device movement mechanism when torque equal to or greater than a predetermined value is delivered, and interlockingly connects the light source movement mechanism to the pickup device movement mechanism; and
   an image forming apparatus which forms an image according to the intensity of light incident to the pickup device included in the image reading device on a recording medium.

6. The multi-function machine according to claim 5, wherein the connection mechanism interlockingly connects the light source movement mechanism to the pickup device movement mechanism by applying an attraction magnetic force having a value enough for generating sliding between the light source movement mechanism and the pickup device movement mechanism when the torque equal to or greater than the predetermined value is delivered.

7. The multi-function machine according to claim 6, further comprising a correction unit which corrects a relative position between the light source and the pickup device in a sub-scanning direction by reciprocally moving the pickup device before an original reading operation when reading of the original is instructed.

8. The multi-function machine according to claim 7, wherein the light source includes a light-emitting diode (LED).

* * * * *